United States Patent
Ricketts et al.

(10) Patent No.: US 9,066,470 B2
(45) Date of Patent: Jun. 30, 2015

(54) SYSTEM AND METHOD FOR CONTROLLING SPREADER OUTPUT FROM A HARVESTER

(71) Applicant: CNH America LLC, New Holland, PA (US)

(72) Inventors: Jonathan E. Ricketts, Coal Valley, IL (US); Jason L. Shonk, Lancaster, PA (US); Bradley J. Wagner, Shippensburg, PA (US)

(73) Assignee: CNH Industrial America LLC, New Holland, PA (US)

( * ) Notice: Subject to any disclaimer, the term of this patent is extended or adjusted under 35 U.S.C. 154(b) by 256 days.

(21) Appl. No.: 13/715,750

(22) Filed: Dec. 14, 2012

(65) Prior Publication Data

US 2014/0171160 A1  Jun. 19, 2014

(51) Int. Cl.
*A01F 12/40* (2006.01)
*A01D 75/00* (2006.01)
*A01D 41/12* (2006.01)

(52) U.S. Cl.
CPC .................................. *A01D 41/1243* (2013.01)

(58) Field of Classification Search
CPC ............. A01D 41/1243; A01D 75/232; Y10S 460/901; Y10S 56/15
USPC ........................... 460/1, 9, 97, 111, 112, 150; 241/101.75, 186.3, 243, 416; 56/192, 56/209
See application file for complete search history.

(56) References Cited

U.S. PATENT DOCUMENTS

| | | | |
|---|---|---|---|
| 3,728,849 A | 4/1973 | Lundahl | |
| 4,875,889 A | 10/1989 | Hagerer et al. | |
| 5,569,081 A | 10/1996 | Baumgarten et al. | |
| 5,797,793 A * | 8/1998 | Matousek et al. | 460/111 |
| 5,983,813 A | 11/1999 | Swab et al. | |
| 6,582,298 B2 | 6/2003 | Wolters | |
| 6,685,558 B2 | 2/2004 | Niermann et al. | |
| 6,783,454 B2 | 8/2004 | Bueermann | |
| 6,881,145 B2 * | 4/2005 | Holmen | 460/112 |
| 7,186,179 B1 | 3/2007 | Anderson et al. | |
| 7,281,973 B2 | 10/2007 | Anderson et al. | |
| 7,306,174 B2 | 12/2007 | Pearson et al. | |
| 7,473,169 B2 | 1/2009 | Isaac | |
| 7,485,035 B1 | 2/2009 | Yde | |
| 7,487,024 B2 | 2/2009 | Farley et al. | |
| 7,559,833 B2 * | 7/2009 | Isaac et al. | 460/111 |
| 7,993,188 B2 | 8/2011 | Ritter | |

(Continued)

FOREIGN PATENT DOCUMENTS

DE   102007037485 B3   1/2009
WO       2010149500 A1   12/2010

*Primary Examiner* — Robert Pezzuto
(74) *Attorney, Agent, or Firm* — Patrick M. Sheldrake; Seyed V. Sharifi T.

(57) ABSTRACT

A harvester including, a spreader system configured to distribute an agricultural material onto a field, wherein the spreader system is configured to receive the agricultural material from a chopper, wherein the spreader system comprises a first panel or vane positioned on a first lateral side of the spreader system, and a second panel or vane positioned on a second lateral side of the spreader system, opposite the first lateral side, and wherein the spreader system is configured to detect a first force applied to the first panel or vane and a second force applied to the second panel or vane, and to adjust a position of the spreader system with respect to the chopper based on the first force, the second force, or a combination thereof.

20 Claims, 4 Drawing Sheets

(56) References Cited

U.S. PATENT DOCUMENTS

| | | |
|---|---|---|
| 8,010,262 B2 | 8/2011 | Schroeder et al. |
| 8,029,347 B2 | 10/2011 | Pohlmann et al. |
| 8,105,140 B2 | 1/2012 | Teroerde et al. |
| 2011/0130181 A1 | 6/2011 | Roberge et al. |
| 2011/0270495 A1 | 11/2011 | Knapp |

* cited by examiner

SYSTEM AND METHOD FOR CONTROLLING SPREADER OUTPUT FROM A HARVESTER

BACKGROUND

The invention relates generally to harvesters, and more specifically, to a system and method for controlling spreader output from a harvester.

A harvester may be used to harvest agricultural crops, such as barley, beans, beets, carrots, corn, cotton, flax, oats, potatoes, rye, soybeans, wheat, or other plant crops. Moreover, a combine (e.g., combine harvester) is a type of harvester generally used to harvest grains (e.g., barley, flax, oats, rye, wheat, etc.). During operation of a combine, the harvesting process may begin by removing a plant from a field, usually using a cutting device. Accordingly, the combine may be used to separate the plant into different agricultural materials, such as grain and material other than grain (MOG).

After separation, the grain is generally directed to a cleaning system, and the MOG is generally directed toward a spreader system, which distributes the MOG across the field. In some combines, the MOG may be chopped before being distributed across the field. Unfortunately, the MOG may be distributed unevenly across the field. For example, one side of the combine may distribute a greater amount of the MOG than the opposite side of the combine. This may be a result of multiple factors, such as, a slope or contour of the field, wind, moisture, and so forth.

BRIEF DESCRIPTION

In a first embodiment, a harvester including, a spreader system configured to distribute an agricultural material onto a field, wherein the spreader system is configured to receive the agricultural material from a chopper, wherein the spreader system comprises a first panel or vane positioned on a first lateral side of the spreader system, and a second panel or vane positioned on a second lateral side of the spreader system, opposite the first lateral side, and wherein the spreader system is configured to detect a first force applied to the first panel or vane and a second force applied to the second panel or vane, and to adjust a position of the spreader system with respect to the chopper based on the first force, the second force, or a combination thereof.

In another embodiment, a harvester including a chopper configured to receive an agricultural material removed from a field by the harvester, and to chop the agricultural material, and a spreader system configured to adjust a position of the spreader system in a perpendicular direction with respect to a rotational axis of the chopper, in a parallel direction with respect to the rotational axis of the chopper, or a combination thereof, and to evenly distribute the agricultural material onto the field using a first spreader and a second spreader.

In another embodiment, a method for distributing agricultural material removed from a field by a harvester, including detecting a first force applied to a first panel or vane using a first sensor, detecting a second force applied to a second panel or vane using a second sensor, comparing the first and second forces, and adjusting a position of a spreader system based at least partially on the first and second forces.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
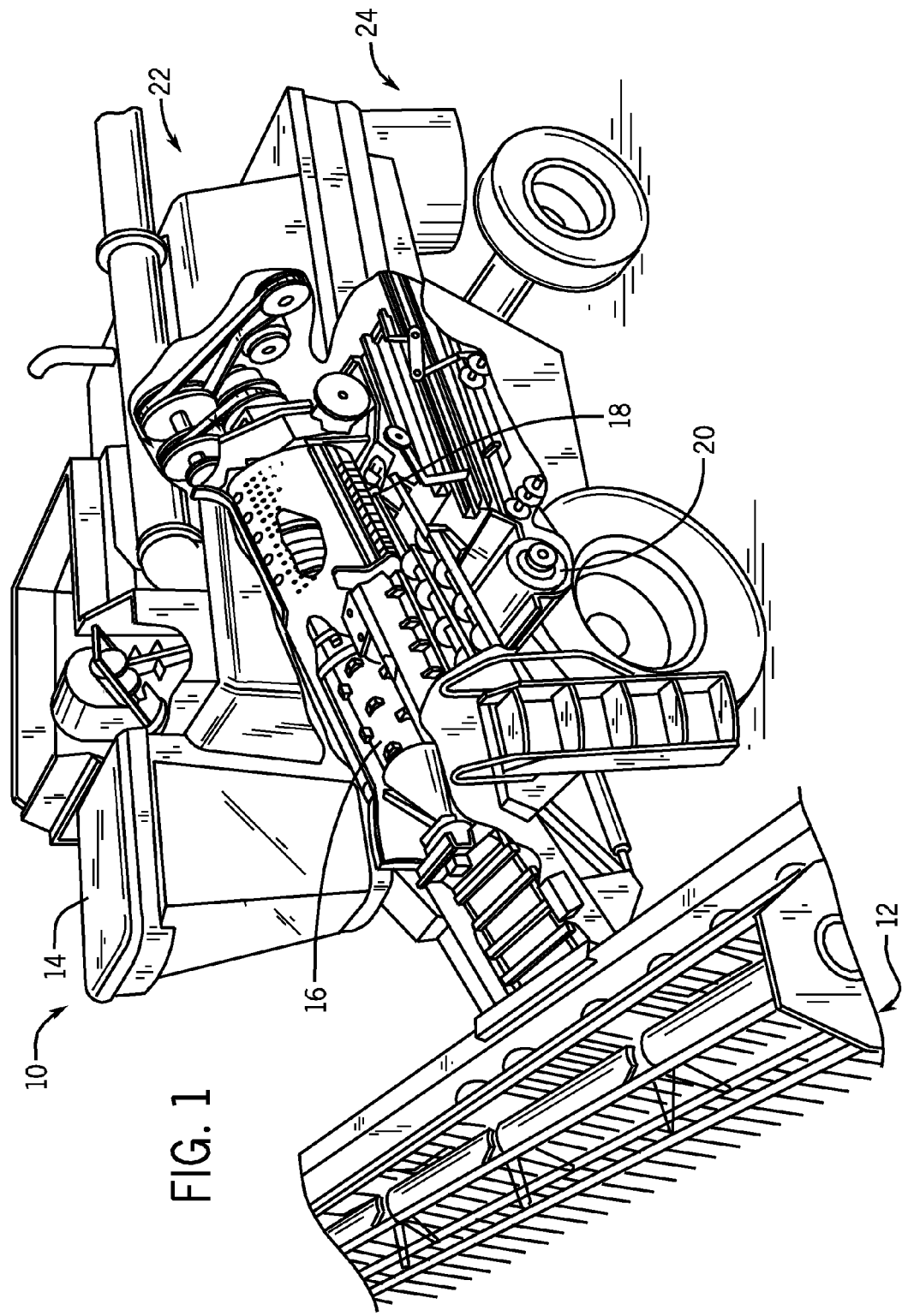
FIG. 1 is a perspective view of an embodiment of a harvester which may be configured to control distribution of a material other than grain (MOG) using a spreader system.

Turning now to the drawings, FIG. 1 is a perspective view of a harvester 10 (e.g., combine) which may be configured to control an amount of material other than grain (MOG) distributed using an adjustable spreader system. The harvester 10 may be configured to harvest grains such as barley, flax, oats, rye, wheat, and so forth. Accordingly, the harvester 10 is configured to remove plants from a field, and to separate the plants into grain and MOG. As may be appreciated, the harvester 10 includes various systems that are used during harvesting.

The harvesting process begins with the harvester 10 using a cutting assembly 12 to remove plants from the field. An operator of the harvester 10 may be seated in a cab 14, and the operator may monitor the operation of the cutting assembly 12 and other systems of the harvester 10. After removing the plants, the harvester 10 transports the plants to a rotor 16. The rotor 16 rotates to separate the grain of the plants from the MOG. Specifically, the rotor 16 has multiple projections on its surface that interact with the plants to facilitate separation of the grain from the MOG. Grain is directed from the rotor 16 toward a cleaning system 18. The cleaning system 18 is configured to further separate the grain from the MOG (e.g., agricultural material such as straw, soil, etc.) using a blower 20. The MOG is directed toward a pan 22, which provides the MOG to a spreader system 24 for distribution onto a field. Moreover, the spreader system 24 is configured to adjust its position based on changes in MOG flow to facilitate even distribution of MOG onto the field. The adjustable spreader system 24 may be controlled to compensate for uneven MOG flow distribution due to various factors, such as wind, moisture, a slope of the field, contours of the field, and so forth.

Figure 2:
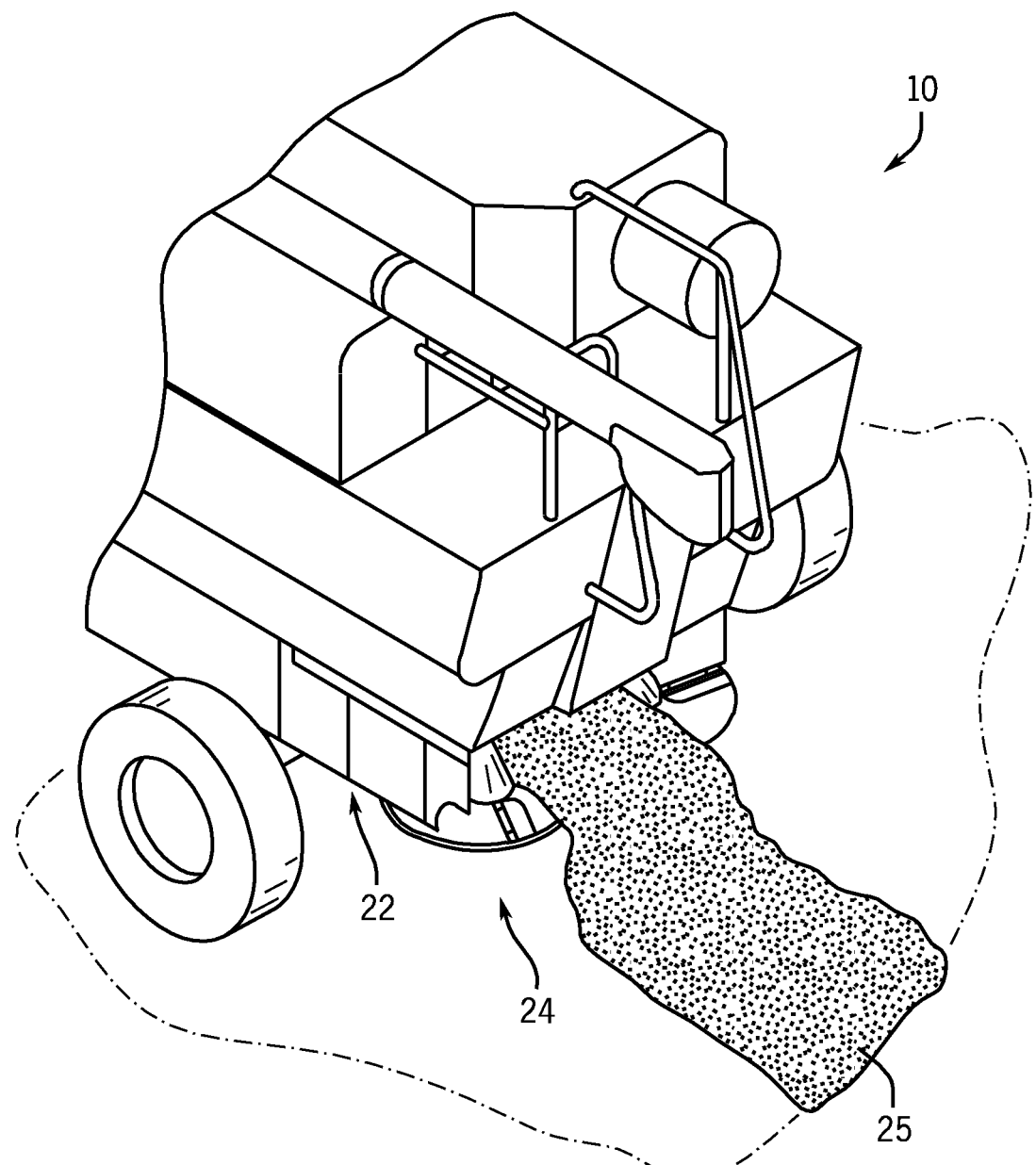
FIG. 2 is a rear perspective view of an embodiment of a harvester which may be configured to control MOG distribution using a spreader system.

FIG. 2 is rear perspective view of an embodiment of a harvester 10, which may be configured to control distribution of MOG 25 using the spreader system 24. As illustrated, the pan 22 and the spreader system 24 are positioned at the rear end of the harvester 10. The spreader system 24 includes spreaders configured to direct the MOG 25 away from the harvester 10, and to distribute the MOG 25 across the field. In certain embodiments, the pan 22 and the spreader system 24 may be positioned at any suitable location on the harvester 10. As may be appreciated, the spreader system 24 may be controlled to facilitate even distribution of MOG 25 across the field. The spreader system 24 may be controlled manually and/or automatically. For example, an operator may manually adjust a position of the spreader system 24, such as by using a manually controlled actuator. Moreover, a controller may be employed to automatically adjust a position of the spreader system 24 without operator intervention (e.g., based on detected uneven distribution of the MOG).

Figure 3:
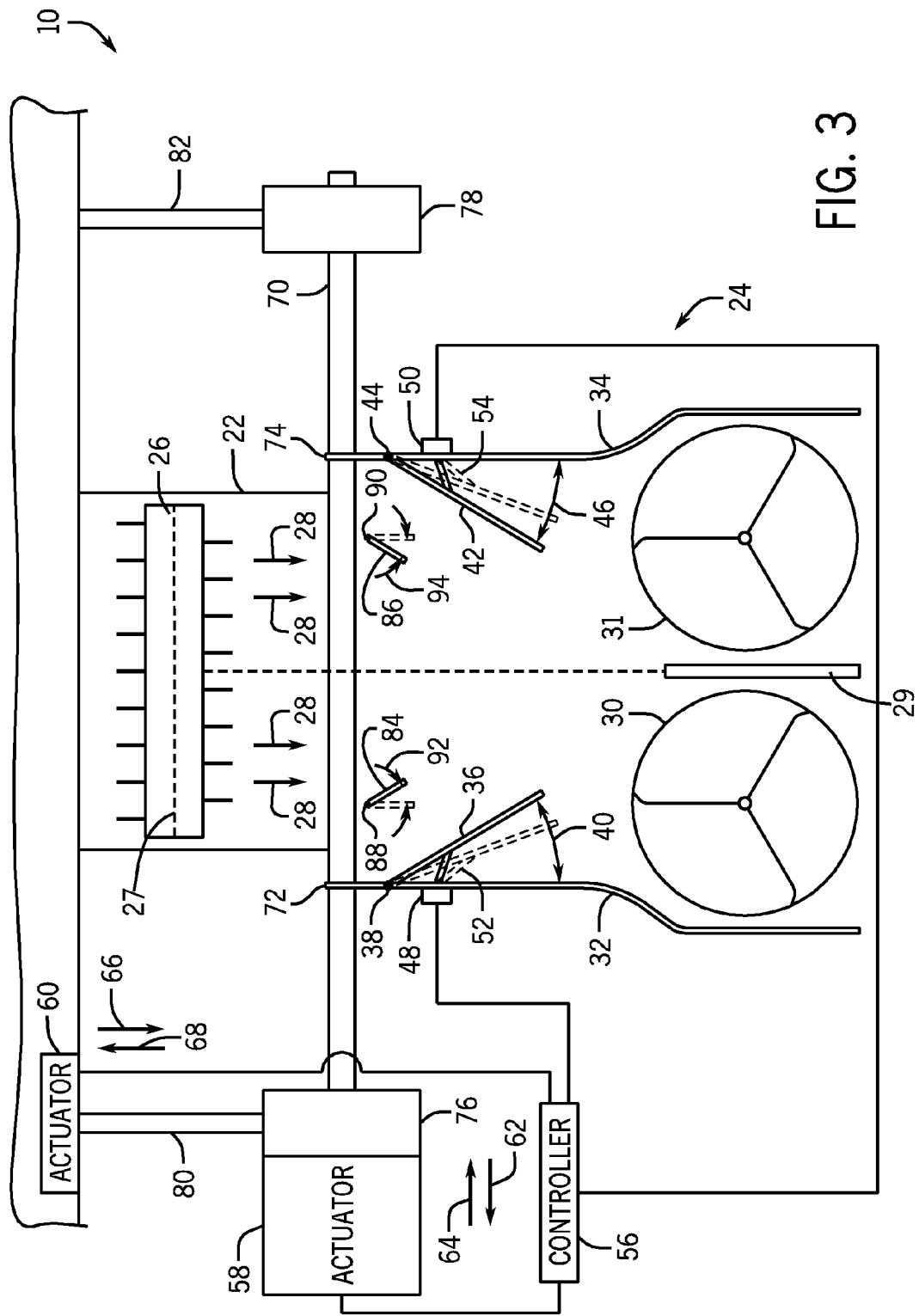
FIG. 3 is a schematic diagram of an embodiment of an adjustable spreader system configured to control MOG distribution.

FIG. 3 is a schematic diagram of an embodiment of the adjustable spreader system 24. After the harvester 10 separates grain from MOG, the MOG is directed toward a chopper 26, which receives MOG that has been removed from the field by the harvester 10. The chopper 26 is configured to rotate about a rotational axis 27, and to chop the MOG to facilitate distribution of smaller pieces of agricultural material across the field. As illustrated, the MOG is directed through the pan 22, as illustrated by arrows 28. As the MOG flows in direction 28, it travels from the pan 22 into the spreader system 24. In the spreader system 24 a divider 29 directs the MOG to a first spreader 30, and to a second spreader 31 for distribution across the field.

As mentioned above, the spreader system 24 is configured to evenly distribute MOG across a field. More specifically, the spreader system 24 facilitates even distribution of MOG across a field by evenly distributing the MOG between the spreaders 30 and 31. As will be discussed in more detail below, the spreader system 24 adjusts its position with respect to the chopper 26 to facilitate even distribution of the MOG through the spreader system 24, and thus even distribution of the MOG onto the field using the spreaders 30 and 31 (i.e., each spreader receives a substantially equal portion of the MOG flow).

The spreader system 24 includes a first side wall 32 and a second side wall 34, positioned on opposite lateral sides of the system 24. A first side panel 36 is rotatably coupled to the first side wall 32 via a hinge 38 that facilitates rotation of the first side panel 36 relative to the first side wall 32. Accordingly, the first side panel 36 may rotate about the hinge 38 to an angle 40 as MOG flows through the spreader system 24 and contacts the first side panel 36. Similarly, a second side panel 42 is rotatably coupled to the second side wall 34 via a hinge 44 that facilitates rotation of the second side panel 42 relative to the second side wall 34. Accordingly, the second side panel 42 may rotate about the hinge 44 to an angle 46 as MOG flows through the spreader system 24 and contacts the second side panel 42. As explained above, MOG flows from the chopper 26 and into the spreader system 24. As the MOG flows between the walls 32 and 34, forces applied by the MOG may induce rotation of the panels 36 and 42. For example, if more MOG flow contacts the first side panel 36 than the second side panel 42, the first panel 36 deflects more than the second panel 42 (i.e., angle 40 is less than angle 46). Moreover, in other situations the MOG flow from the chopper 26 may be unevenly distributed with more MOG contacting the second panel 42, inducing the second panel 42 to rotate more than the first panel 36 (i.e., angle 46 is less than angle 40). When MOG flow is evenly distributed into the spreader system 24, the panels 36 and 42 rotate a substantially even amount, and thus, angles 40 and 46 are approximately equal. In contrast, when MOG flow is unevenly distributed into the spreader system 24, the MOG induces the panels 36 and 42 to rotate differently (i.e., one panel may rotate more than the other panel).

In order to detect the forces applied to the panels 36 and 42 by the MOG, the spreader system 24 includes a first sensor 48 coupled to the first wall 32 and a second sensor 50 coupled to the second wall 34. The first and second sensors 48 and 50 include respective first and second load sensor arms 52 and 54 that contact the first and second side panels 36 and 42. As MOG flows from the chopper 26 into the spreader system 24, force applied by the MOG induces the first and second panels 36 and 42 to rotate about the hinges 38 and 44, thereby changing the angles 40 and 46. The rotation of the side panels 36 and 42, in turn, induces rotation of the load sensor arms 52 and 54. The sensors 48 and 50 detect force applied by the sensor arms 52 and 54, and thus force applied to the side panels 36 and 42. The sensors 48 and 50 communicate the force data to a controller 56 used to adjust the spreader system 24.

The controller 56 instructs actuators to adjust the position of the spreader system 24 with respect to the chopper 26 and the pan 22. As illustrated, there are two actuators 58 and 60, but other embodiments may have a different number of actuators (e.g., 1, 2, 3, 4, 5, or more actuators). The actuators 58 and 60 may be electrically driven, hydraulically driven, or pneumatically driven. The actuators 58 and 60 control movement of the spreader system 24 to the left, the right, fore, and aft. In the illustrated embodiment, the actuator 58 controls movement of the spreader system 24 to the left and to the right in directions illustrated by arrows 62 and 64. Moreover, the actuator 60 controls movement of the spreader system 24 fore and aft in directions illustrated by arrows 66 and 68. The spreader system 24 is coupled to a shaft 70 (or rail) at points 72 and 74. The shaft 70 moves the spreader system 24 to the left and to the right through supports 76 and 78 in response to movement of the actuator 58. Moreover, the actuator 60 enables the shaft 70 to move fore and aft by controlling movement of the shafts 80 and 82 (or rails) coupled to the supports 76 and 78.

During operation, the chopper 26 moves MOG in the direction 28 and into the spreader system 24. As the MOG flows through the spreader system 24, it contacts and applies force to the panels 36 and 42. The force applied to the panels 36 and 42 directs the first panel 36 toward the first wall 32, and the second panel 42 toward the second wall 34. Thereby, the panels 36 and 42 apply force to the sensor arms 52 and 54, respectively. The sensors 48 and 50 sense the force applied to the sensor arms 52 and 54, and thus the amount of force applied to the side panels 36 and 42. The sensors 48 and 50 send signals indicative of the applied forces to the controller 56 for comparison. When MOG flow into the spreader system 24 is evenly distributed, the forces applied by the MOG to the panels 36 and 42 are approximately equal. In contrast, when MOG flow into the spreader system 24 is evenly distributed, the MOG applies different forces to the panels 36 and 42 to rotate differently (i.e., the angles 40 and 46 are different).

The controller 56 compares the force applied to the panel 36 to the force applied to the panel 42 to determine whether one panel has rotated more than the other (i.e., whether MOG is unevenly flowing through the spreader system 24). If the controller 56 determines that one of the panels 36 or 42 has rotated more than the other, the controller 56 instructs one or both of the actuators 58 and 60 to move the spreader system 24 to facilitate even MOG flow through the spreader system 24. For example, if the controller 56 determines that panel 36 has rotated more than panel 42 (i.e., MOG flow is heavier near wall 32), the controller 56 instructs the actuator 58 to move the shaft 70, and thus the spreader system 24, in the direction 62. As the spreader system 24 moves in the direction 62, the MOG flow moves away from the wall 32 (i.e., the MOG flow is realigned with the spreader system 24), enabling the panel 36 to increase angle 40. The actuator 58 continues to move in the direction 62 until the controller 56 senses that the forces applied to the panels 36 and 42 are approximately equal (difference between forces is less than a threshold value). Moreover, the controller 56 may also activate the actuator 60 to move the spreader system in the direction 68, thus reducing the distance between the chopper 26 and the spreaders 30 and 31 (i.e., reducing the time and distance for MOG to flow unevenly into the spreader system 24).

Similarly, if the controller 56 determines that panel 42 has rotated more than panel 36 (i.e., MOG flow is heavier near wall 34), the controller 56 instructs one or both of the actuators 58 and 60 to move the MOG flow away from the wall 34 (i.e., centering the MOG flow into the spreader system 24). More specifically, the actuator 58 moves the shaft 70, and thus the spreader system 24, in direction 64. As the spreader system 24 moves in direction 64 the MOG flow moves away from the wall 34, increasing the angle 46 as the panel 42 to returns to a neutral position. The actuator 58 continues to move in direction 64 until the controller 56 senses that the forces applied to the panels 36 and 42 are again approximately equal.

In others embodiments, the spreader system 24 may include rotatable vanes 84 and 86 with or without the panels 36 and 42. While the illustrated embodiment includes two vanes, other embodiments may include a different number of vanes (e.g., 1, 2, 3, 4, 5, 6, 7, 8, or more vanes). Moreover, these vanes may be placed in different position in the harvester 10 (e.g., on the pan 22, near the spreader 30 and 31, etc.). The rotatable vanes 84 and 86 function in a similar manner to the panels 36 and 42. Specifically, the vanes 84 and 86 connect to the spreader system 24 with hinges 88 and 90, respectively. The vanes 84 and 86 rotate about the hinges 88 and 90 in response to MOG flow through the spreader system 24. The vanes 84 and 86 may connect to the respective sensors 48 and 50, or other sensors. The sensors sense force applied to the vanes 84 and 86 as they rotate through respective angles 90 and 92. The sensors transmit the force data to the controller 56, which determines whether more force is applied to vane 84 than vane 86. As discussed above, MOG may flow unevenly into the spreader system 24. When MOG flow is unevenly distributed into the spreader system 24, the MOG induces the vanes 84 and 86 to rotate differently (i.e., one vane may rotate more than the other vane). For example, if there is more MOG flow near vane 84, the vane 84 may rotate through a larger angle 92 than the vane 86. In other situations, the opposite may occur with more MOG flow near vane 86 inducing vane 86 to rotate through a larger angle 94 than the vane 84. In contrast, when MOG flow is evenly distributed into the spreader system 24, the angles 92 and 94 are approximately equal. As the controller 56 receives and compares the signals indicative of vane rotation, the controller 56 determines whether one vane has rotated more than the other vane. The controller 56 then uses the vane rotation data to control the actuators 58 and 60 to reposition the spreader system 24 with respect to the chopper 26, and thus evenly distribute the MOG flow into the spreaders 30 and 31.

Figure 4:
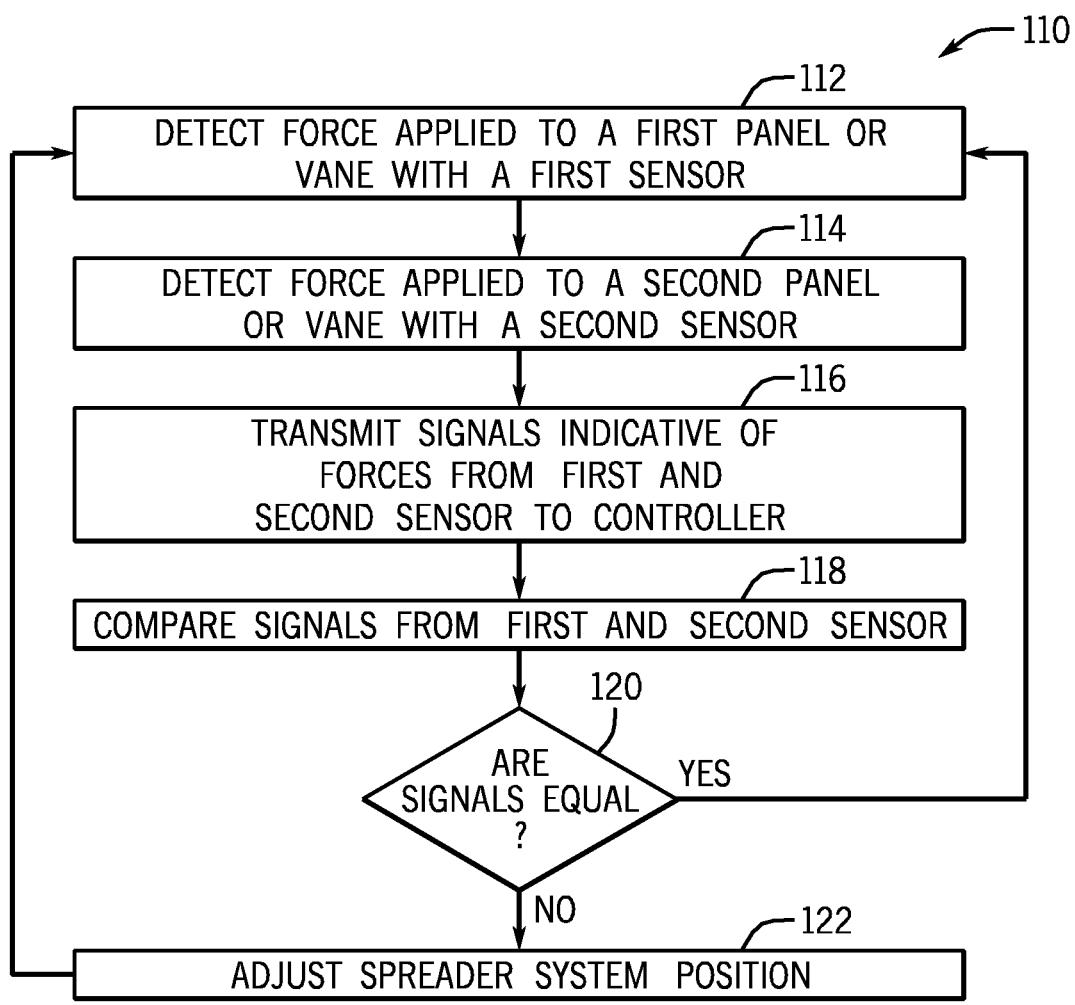
FIG. 4 is a flowchart of an embodiment of a method for distributing MOG removed from a field by a harvester.

FIG. 4 is a flowchart of an embodiment of a method 110 for distributing MOG removed from a field by the harvester 10. As discussed above, the first sensor 48 detects force applied to the first panel 36 or the first vane 84 (block 112). The second sensor 50 detects force applied to of the second panel (e.g., 42) or vane (e.g., 86) (block 114). The sensors 48 and 50 transmit signals indicative of force applied to the first and second panels 36 and 42 to the controller 56 (block 116). The controller 56 compares the force applied to the first panel or vane to the force applied to the second panel or vane using the signals from the sensors 48 and 50 (block 118). At decision point 120, the controller 56 determines if the signals are substantially equal (i.e., compare difference to threshold value). If the controller 56 determines that the first panel or vane and the second panel or vane have substantially equal force applied, the method returns to block 112 and continues detecting the force applied to the panels or vanes. If the controller 56 determines that one panel or vane is experiencing more force than the other panel or vane, the controller 56 instructs the actuators to adjust the position of the spreader system 24 to realign the MOG through the spreader system 24 (block 122). For example the controller 56 may instruct the actuator 58 to adjust the spreader system 24 to the left or to the right, and may instruct the actuator 60 to adjust the spreader system fore and aft. After moving the spreader system 24, the method 110 repeats to determine whether movement of the spreader system 24 (e.g., realignment of the spreader system 24 with the chopper) results in even distribution of MOG through the spreader system 24.

Using the systems and methods described herein, the harvester 10 may be able to more evenly distribute MOG across a field using the spreader system 24. For example, if an operator detects that MOG is being distributed unevenly, the operator may adjust the spreader system 24 to facilitate a more even distribution of MOG. Accordingly, the amount of MOG distributed by individual spreaders 30 and 31 of the spreader system 24 may be controlled.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A harvester comprising:
a spreader system configured to distribute an agricultural material onto a field, wherein the spreader system is configured to receive the agricultural material from a chopper;
wherein the spreader system comprises at least one spreader at least one of a first panel and vane positioned on a first lateral side of the spreader system, and at least one of a second panel and vane positioned on a second lateral side of the spreader system, opposite the first lateral side, and wherein the spreader system configured to detect a first force applied to the at least one of the first panel and vane and a second force applied to the at least one of the second panel and vane, and to adjust at least one of a lateral or longitudinal position of the spreader system with respect to the chopper based on the first force, the second force, or a combination thereof.

2. The harvester of claim 1, wherein the agricultural material comprises a material other than grain (MOG).

3. The harvester of claim 1, wherein the at least one spreader comprises a first rotatable spreader and a second rotatable spreader.

4. The harvester of claim 1, wherein the spreader system further comprises a first sensor and a second sensor, and wherein the first and second sensors are configured to detect force applied to the respective first and second panels.

5. The harvester of claim 4, wherein the spreader system further comprises a controller configured to receive signals from the first sensor and the second sensor indicative of the first and second forces on the respective first and second panels or vanes.

6. The harvester of claim 5, comprising an actuator configured to move the spreader system in a lateral direction parallel to a rotational axis of the chopper based on a signal from the controller.

7. The harvester of claim 6, comprising a shaft extending from the actuator, and coupled to the spreader system.

8. The harvester of claim 6, wherein the actuator is an electrically driven actuator, a hydraulically driven actuator, or a pneumatically driven actuator.

9. The harvester of claim 5, comprising an actuator configured to move the spreader system in a longitudinal direction perpendicular to a rotational axis of the chopper based on a signal from the controller.

10. The harvester of claim 9, wherein the actuator is an electrically driven actuator, a hydraulically driven actuator, or a pneumatically driven actuator.

11. The harvester of claim 1, comprising rotatable vanes configured to rotate in response to the flow of agricultural material.

12. A harvester comprising:
 a chopper configured to receive an agricultural material removed from a field by the harvester, and to chop the agricultural material; and
 a spreader system comprising first and second rotatable spreaders;
 a control system configured to adjust a position of the spreader system in a perpendicular direction with respect to a rotational axis of the chopper, in a parallel direction with respect to the rotational axis of the chopper, or a combination thereof such that at least one of a lateral position and longitudinal distance between the chopper and the first and second rotatable spreaders is changed, and to evenly distribute the agricultural material onto the field using the first spreader and the second spreader.

13. The harvester of claim 12, wherein the spreader system further comprises at least one of a rotatably mounted first panel and vane, and at least one of a rotatably mounted second panel and vane, the at least one first and second panels and vanes are configured to rotate in response to the flow of agricultural material through the spreader system, and wherein the spreader system is configured to detect rotation of the at least one of first and second panels and vanes, and to adjust the position of the spreader system with respect to the chopper based on the detected rotation.

14. The harvester of claim 13, wherein the spreader system further comprises a first sensor, a second sensor, and a controller, and wherein the controller is configured to communicate with the first and second sensors as the first and second sensors receive signals indicative of rotation by the respective at least one of the first panel vane and at least one of the second panel and vane.

15. The harvester of claim 14, wherein the spreader system further comprises an actuator configured to adjust the position of the spreader system with respect to the chopper based on input from the controller.

16. A method for distributing agricultural material removed from a field by a harvester, comprising:
 detecting a first force applied to a first panel or vane using a first sensor;
 detecting a second force applied to a second panel or vane using a second sensor;
 comparing the first and second forces; and
 adjusting at least one of a lateral and a longitudinal position of a spreader system with respect to the harvester based at least partially on the first and second forces.

17. The method of claim 16, wherein comparing the first and second force, comprises receiving signals at a controller from the first and second sensors, and calculating a difference between the first and second forces using the signals.

18. The method of claim 16, wherein adjusting the position of the spreader system comprises controlling an actuator.

19. The method of claim 18, wherein controlling the actuator comprises manually controlling the actuator.

20. The method of claim 18, wherein controlling the actuator comprises controlling the actuator using a controller.

* * * * *